Figures 1, 2, 3:
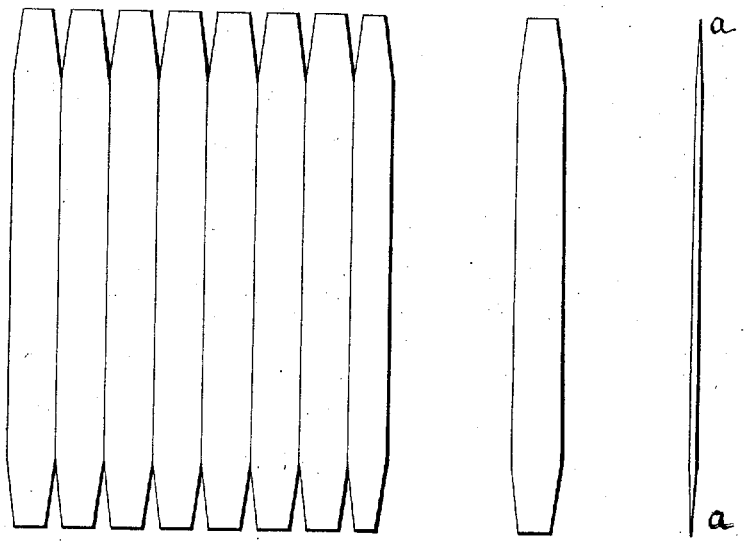

I. F. WILCOX.
Basket-Splint.

No. 8,747. Reissued June 10, 1879.

Witness:
E. H. Schott.
W. C. Chaffee

Inventor:
Irving F. Wilcox
by
J. H. Paskert Atty

N. PETERS, PHOTO-LITHOGRAPHER, WASHINGTON, D. C.

UNITED STATES PATENT OFFICE.

IRVING F. WILCOX, OF STREETSBOROUGH, OHIO.

IMPROVEMENT IN BASKET-SPLINTS.

Specification forming part of Letters Patent No. 121,304, dated November 28, 1871; Reissue No. 8,747, dated June 10, 1879; application filed October 28, 1878.

*To all whom it may concern:*

Be it known that I, IRVING F. WILCOX, of Streetsborough, county of Portage, State of Ohio, have invented an Improvement in Basket-Splints, of which the following is a specification.

This invention relates to an improvement in the material from which baskets are made, the object being to lessen the cost of production and furnish an article which shall be uniform in the width and thickness for the different kinds of baskets to be manufactured; and it consists in a chamfered splint cut with parallel edges and even thickness from a sheet cut from a log in concentric circles, thus following the grain of the wood, and finished with a fine surface on one side of the splint, being an article of great beauty, elasticity, and pliability, capable of being worked into nearly all the forms of baskets now in use, and which is produced at an exceedingly low rate, thus reducing the cost of material to the basket-maker, as well as that of the finished article to the general public.

In the drawings, Figure 1 is a view of the sheets of the material as cut from the log, showing how it is divided. Fig. 2 is one of the splints prepared for use. Fig. 3 is an edge view of the same.

In producing my improved splint I take a log of suitable timber, free from knots, and of a length corresponding to that of the splints to be manufactured, and place it in a machine similar to those used for cutting veneers, but provided with an additional reciprocating knife of proper form, which trims the splints to the size and shape desired. The splints are chamfered at their ends in any convenient manner to the shape required for the purpose to which they are to be applied, as shown at *a* in Fig. 3.

It will be evident that these splints may be used for other purposes than the making of baskets, as their smooth surface and pliability will render them useful for the manufacture of many other articles. I am thus enabled to furnish the trade with a very superior article, having a fine surface upon one side, of even thickness and strength, and at a much less cost than they can be produced by any of the various methods in ordinary use.

Having thus described my invention, I claim as new, and desire to secure by Letters Patent, the following:

As an improved article of manufacture, a basket-splint following the grain of the wood, of even thickness, and having parallel edges, a fine surface on one side, and chamfered at the ends, substantially as set forth.

IRVING F. WILCOX.

Witnesses:

JAMES W. FOLEY,

H. B. FOSTER.